(12) United States Patent
Tan et al.

(10) Patent No.: US 6,625,318 B1
(45) Date of Patent: Sep. 23, 2003

(54) ROBUST SEQUENTIAL APPROACH IN DETECTING DEFECTIVE PIXELS WITHIN AN IMAGE SENSOR

(76) Inventors: Yap-Peng Tan, 1100 N. Priest Dr., Apt. #2123, Chandler, AZ (US) 85226; Tinku Acharya, 7292 S. Roberts Rd., Tempe, AZ (US) 85283

( * ) Notice: Subject to any disclaimer, the term of this patent is extended or adjusted under 35 U.S.C. 154(b) by 534 days.

(21) Appl. No.: 09/191,310

(22) Filed: Nov. 13, 1998

(51) Int. Cl.[7] ............................................... G06K 9/62
(52) U.S. Cl. ...................................... 382/224; 348/131
(58) Field of Search ............................... 382/124, 127, 382/141, 224, 226, 229, 221, 220, 173, 275, 181; 356/124; 348/131

(56) References Cited

U.S. PATENT DOCUMENTS

| | | | | |
|---|---|---|---|---|
| 4,598,420 A | * | 7/1986 | Harvey | 382/8 |
| 4,817,166 A | * | 3/1989 | Gonzalez et al. | 382/1 |
| 5,007,734 A | * | 4/1991 | Wilms | 356/124 |
| 5,717,781 A | * | 2/1998 | Ebel et al. | 382/141 |

OTHER PUBLICATIONS

International Search Report, PCT/US99/26204, Nov. 4, 1999, 5 pages.

* cited by examiner

*Primary Examiner*—Jayanti K. Patel
*Assistant Examiner*—Seyed Azarian (57) ABSTRACT

What is disclosed is a method comprising performing an observation on a sensor having a plurality of pixels, for each of the pixels that are unclassified, determining a score according to the observation, if the score for the each pixel satisfies a stopping condition, classifying the each pixel as being one of either defective or functional, and repeating the steps of performing, determining and classifying for any the pixels remaining unclassified after determining the score.

20 Claims, 5 Drawing Sheets

Fig. 1

Neighborhood of measurement surrounding a given pixel in the image →

| $X_1$ | $X_2$ | $X_3$ |
|---|---|---|
| $X_4$ | $X_5$ | $X_6$ |
| $X_7$ | $X_8$ | $X_9$ | e.g., $Y = \min(|X_5 - X_k|)_{k \in \{1,2,3,4,6,7,8,9\}}$ : Monochrome e.g., $Y = \min(|X_5 - X_k|)_{k \in \{1,3,7,9\}}$ if $X_5$ is a Green pixel in the Bayer Pattern

Fig. 2

If b is intensity at location yielding MND
- Stuck High: $C \approx |255 - b|$
- Stuck Low: $C \approx |b|$
- Abnormal Response: $C \approx 0.15 * b$

ROBUST SEQUENTIAL APPROACH IN DETECTING DEFECTIVE PIXELS WITHIN AN IMAGE SENSOR

BACKGROUND OF THE INVENTION

1. Field of the Invention

The invention relates generally to imaging. More specifically, the invention relates to detecting defective pixels in an image sensor.

2. Description of the Related Art

Imaging devices such as digital cameras and scanners may have as one component, an image sensor which is manufactured as a CCD (Charge Coupled Device), CID (Charge Injection Device) or CMOS (Complementary Metal-Oxide Semiconductor) device. The image sensor is composed of an array of "sense" or pixel locations which captures energy from a illuminant, often converting this energy into a concrete measure such as an intensity value. In most cases, imaging sensors will have a certain number of pixel locations which are "defective" due to fabrication or manufacturing errors. It is extremely difficult, if not impossible, to guarantee during such fabrication/manufacturing that none of the pixels in the sensor will be defective. A "defective" pixel of a sensor is one which when exposed to an illuminant will produce a different intensity value or response than that of a "fully functional" pixel when exposed to that same illuminant. In other words, the defective pixel is abnormally sensitive/unsensitive to light than a fully functional pixel. Such defects if not detected and then compensated for, may cause the captured image to be of less visually perceived quality and if prominent can detract the attention of the viewer towards the defective pixel(s).

Defects in pixel locations can be split into three categories-Stuck High, Stuck Low and Abnormal Response. A Stuck High defective pixel is one which always responds to the lighting condition by producing a high intensity value. For instance, if the intensity of pixels ranges from 0 to a high of 255, a Stuck High pixel would always respond to lighting with a value of 255, even if actual measured intensity for that location of the scene would be 25, for example, if captured by a functional pixel. A Stuck Low defective pixel is one which always responds to the lighting condition by producing a low intensity value. A Stuck Low pixel may respond with a value of 5 even though a functional pixel would show the intensity value to be 200, 100 etc. A pixel with an Abnormal Response defect has no absolute, but rather a relative variance from a functional pixel. For instance such a pixel would inaccurately respond by a particular percentage, such that, for instance, were a functional pixel would read a value X, the Abnormal Response defective pixel would respond with a value 0.25*X. The Abnormal Response is thus proportional or relative to the intensity being captured, rather than an absolute high or low. Pixels exhibiting any of these types of defects should, desirably, be corrected or compensated for.

The first step in any such compensation is the detection of which pixels are in fact "defective". Conventionally, such detection is performed by identifying the defective pixel locations in a controlled environment, such as during quality control for the sensor as a whole, after the sensor is fabricated. The identified locations are recorded and then transferred to some non-volatile memory on the device in which the sensor is used such as on a digital camera. In modern "mega-pixel" image sensors, where the total size of the sensors have on the order of 1000 by 1000 pixels, many pixels may be defective. The extra memory needed to store the defective pixel locations adds to the total cost/time-to-manufacture of the device and also requires actual data transfer during the process of assembling/integrating the sensor into the device. The defective pixel locations must be separately stored prior to device assembly into a fixed memory such as a hard disk. Once the defective locations are stored, signal processing techniques post image capture may be used to correct the defective pixels. A more arbitrary way of correction image defects, which has also been utilized, is to not detect defective pixels, but treat the unknown defects as noise and apply an image-by-image noise removal technique to the entire sensor output (image). While avoiding memory cost and data transfer during assembly, such techniques have the disadvantage of being computationally expensive to implement and of potentially reducing the sharpness of the image, which is a key to visual appearance.

For these reasons, there is a need for a method to detect and compensate for defective pixel locations without adding to the time/cost of manufacture of the device and without sacrificing image quality or adding to the computation requirements during image processing on the device in which the sensor is to be employed.

SUMMARY

What is disclosed is a method comprising performing an observation on a sensor having a plurality of pixels, for each of the pixels that are unclassified, determining a score according to the observation, if the score for the each pixel satisfies a stopping condition, classifying the each pixel as being one of either defective or functional, and repeating the steps of performing, determining and classifying for any the pixels remaining unclassified after determining the score.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
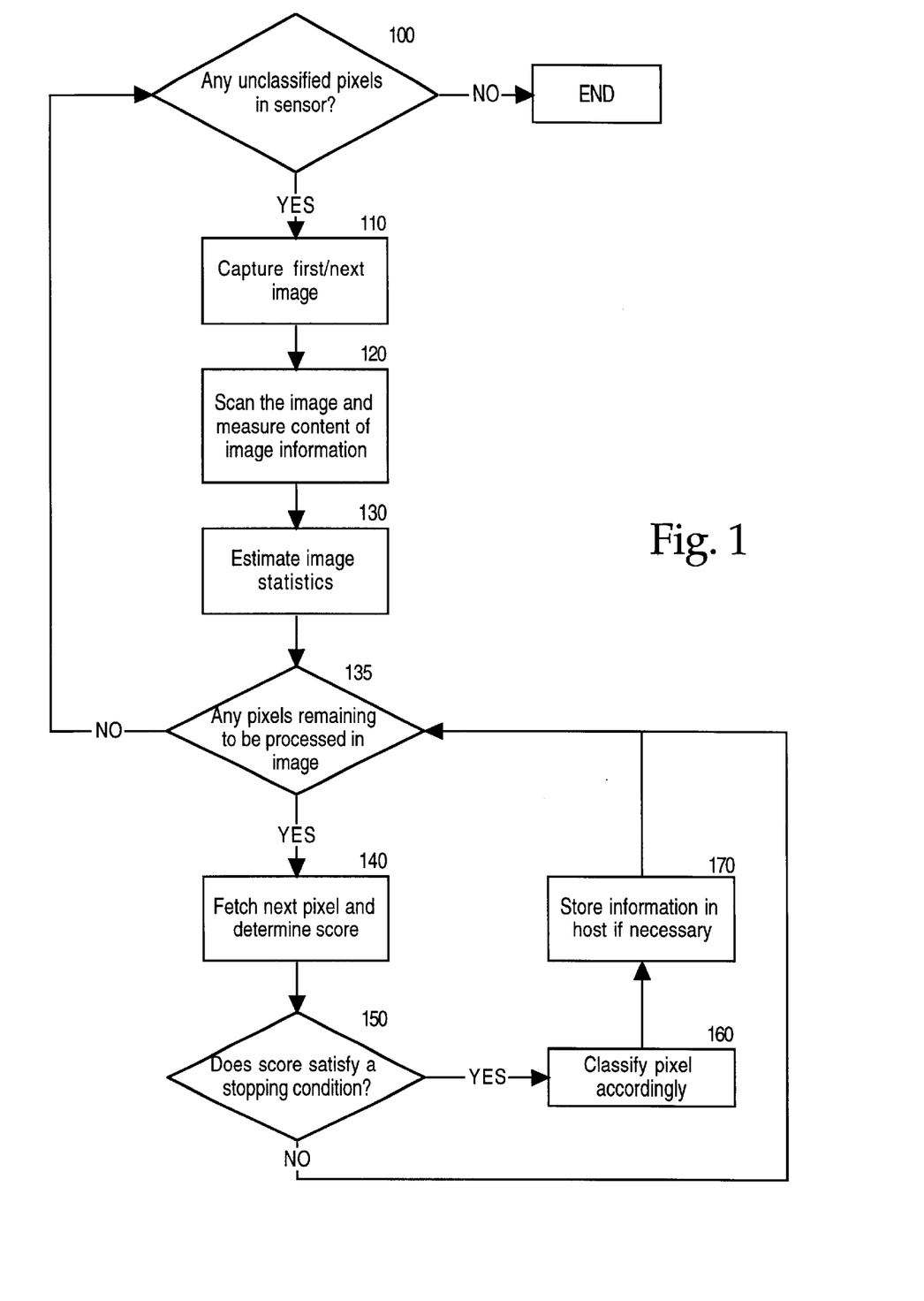
FIG. 1 is a flow diagram of an embodiment of the invention.

FIG. 1 is a flow diagram of an embodiment of the invention.

In statistical analysis, an approach known as the Sequential Probability Ratio Test (SPRT), set forth in "Sequential Analysis", A. Wald (Wiley & Sons, New York 1947), has been developed. In the SPRT approach, an inference is made which attempts to identify one of two hypotheses from a sequence of observations. For instance, in the defective pixel detection case, the hypotheses may be the presence of a defective pixel and the presence of a functional pixel. When an adequate number of observations are made, a decision may be arrived at as to which of the two hypotheses fit. This decision may or may not be accurate since it is based upon a statistical approximation. The goal then in such approaches is to reduce the impact of false detections upon the decision space. Such approaches also work best when the content of the observed samples is known a priori. The software approach to defective pixel detection, in one embodiment, may impose on the end user the task of initiating the detection/correction process. Since the content of images to be scanned in during this detection process is unknown, the SPRT must be made robust such that it dynamically changes according to measured observations.

With this framework in mind, FIG. 1 illustrates a logic flow that can achieve defective pixel detection. Initially it is assumed that all the pixel locations are unknown or indeterminant (i.e., classified neither defective nor functional). Accordingly, the condition at step 100 would be satisfied. When some pixels remain unclassified, the first step in SPRT classification is to scan in an image using a device that is already constructed with and incorporates the sensor array under consideration (step 110). Each scanned image would represent a new observation upon which measurements may be made. After an image is captured into the sensor array, the image is scanned for information content which can be measured (step 120) such as a readout of the intensity value for each pixel. According to one embodiment of the invention, a measurement is performed by considering the minimum neighboring distance (MND) of surrounding pixels (see FIG. 2) whether the neighborhood is composed of all monochrome pixels or only those in a particular color plane of a Bayer Pattern CFA (Color Filter Array). Next, the image statistics, primarily, the mean, variance and/or standard deviation, of the values are measured (step 130) from the MND. For all unclassified pixel locations (checked at step 135), a "score" is then determined (step 140) location by location. The score is based upon the estimated likelihood of a pixel being defective. If this score satisfies a particular stopping condition (checked at step 150), then the pixel under consideration may be classified accordingly as either being defective or functional (step 160) and further may have a designation as to the type of defect. If not, then another unclassified pixel is processed (repeat from step 135). Advantageously, when a pixel is capable of being classified, the defective pixel locations may all be stored into host computer or external device (step 170) so that corrective measures such as noise reduction may be undertaken on only those pixel locations judged to be defective. This also eliminates the need for storing defective pixel location data on the sensor device, camera and also the need for determining it during manufacture. Further, only defective location need be stored (step 170) with the default that all other locations are functional.

Once all unclassified pixels in given observation (scanned image) are processed (checked at step 135) then the procedure returns to step 100. Again, at step 100, if unclassified pixels still remain even after processing of pixels using the last scanned image, the next image is canned in (step 110) and steps 120–170 are repeated. Each scanned image represents a statistically relevant observation, and on each observation, only those pixels whose scores did not satisfy a stopping condition are reprocessed. This continues until all (or most depending on desired design) pixel locations are classified.

Figure 2:
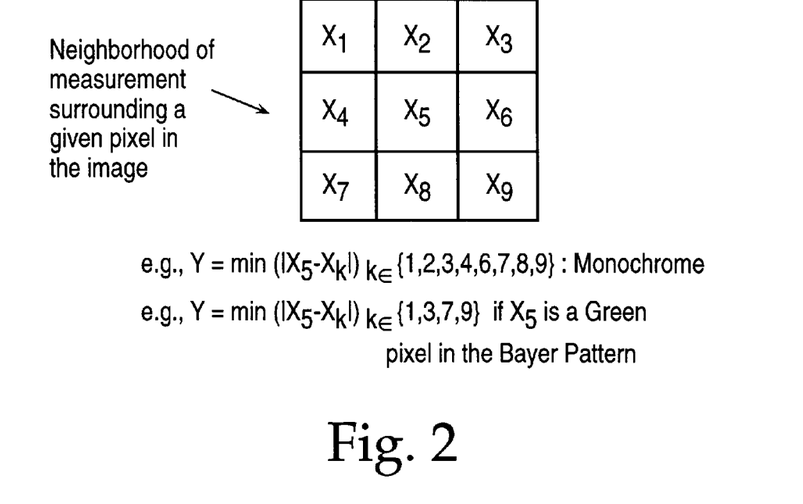
FIG. 2 shows the determining of an MND (Minimum Neighboring Distance) according to an embodiment of the invention.
Figure 3:
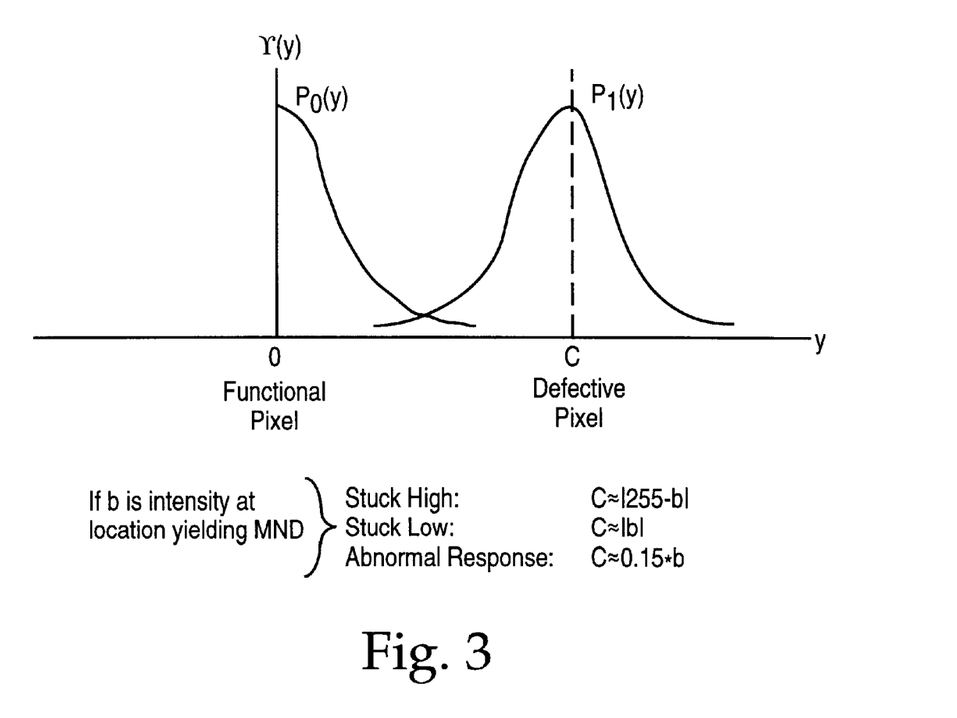
FIG. 3 shows an exemplary probability distribution of MND values for one image.

FIG. 2 shows the determining of an MND (Minimum Neighboring Distance) according to an embodiment of the invention.

A minimum neighboring distance (MND) for a given pixel $X_5$ may be determined by considering the "distance" or differential between neighboring pixel values and that given value. FIG. 2 shows a neighborhood of eight adjacent pixels $X_1$, $X_2$, $X_3$, $X_4$, $X_6$, $X_7$, $X_8$ and $X_9$ about a pixel $X_5$. For a monochrom sensor, or desired output, the distance (i.e., the absolute value difference) between each of those neighbors and the central pixel $X_5$ is computed. The minimum of these distances becomes the MND for that pixel $X_5$. Alternatively, a neighborhood consisting of only north, south, east and west neighbors, X2, X8, X6 and X4, respectively, may be considered in determining the MND. In a Bayer pattern sensor, it may be desirable to consider only those neighboring pixel, in the same color plane (R, G or B). In a sensor array that has a captured intensity value at each location, it is likely that closely neighboring pixels should have the same or similar intensity values with those of their neighbors. This assumes that the neighboring pixels contain no defects (see FIG. 3 and associated description for description of defects). This is especially true with large sensors or a small field of view during image capture or both. The MND, also denoted as Y, tells roughly how close to neighboring pixels a certain pixels response is. For example, Y may be given as $Y=\min(|X_5-X_k|)$ $k\in\{1,2,3,4,6,7,8,9\}$ for a monochrom sensor, or $Y=\min(|X_5-X_k|)$ $k\in\{1,3,7,9\}$ for a Bayer pattern sensor with $X_5$ as a Green pixel. For instance, consider the following intensity values $X_1=100$, $X_2=90$, $X_3=95$, $X_4=105$, $X_6=110$, $X_7=85$, $X_8=80$ and $X_9=75$. If $X_5$, the pixel under consideration, has an intensity value of 102, the minimum neighboring distance would be (102–100)=2, and in reference to FIG. 3, the value of "b", the intensity value of the pixel location ($X_1$) yielding the MND would be 100.

FIG. 3 shows an exemplary probability distribution of MND values for one image. Functional pixels will most likely, in a statistical sense, not deviate far from a neighboring pixel and will probably have the same response. Thus, where the MND is zero, for instance, the pixel under consideration can with a high (perhaps the highest) degree of certainty be classified as functional. Thus, the distribution of Y, which is plotted in FIG. 3 is equal to $P_0$ (y) when the functionality of the pixel is most likely to be guaranteed. The distribution of Y, the MNDs, for functional pixels has been found on experimentation to resemble the well-known Gamma distribution. Based on image statistics, likewise, a gamma distribution curve of the defective pixel classification hypothesis may be derived. The center and exact parameters of the gamma distribution will vary depending upon which type of defect is under concern. If "b" is the intensity value of that neighboring pixel which yielded the MND, then the center C of a distribution for a defect can be modeled by:

Stuck High - - - C ~~ |1255-b|

Stuck Low - - - C ~~ |b|, and

Abnormal Response - - - C ~~ 0.15*b.

The abnormal response defect is assigned an exemplary 15% deviation but may be any value as desired or as motivated by sensor properties or design constraints. In a highly spatially correlated image, a functional pixel will have its MND distribution centered about zero or close to zero and will rapidly diminish with increasing values. The values given above assume an eight bit (ranging from 0 to 255) intensity value at each pixel location. For a stuck high defect, the value C is very close to 255, while for a stuck low, the center of the distribution is approximately b according to the definition of the MND. An abnormal response is a pixel that while not stuck high or stuck low, may be out of an acceptable tolerance. $P_1(y)$ is the probability of the hypothesis of defect being true while $P_0(y)$ is the probability of the other hypothesis that of a functional pixel being true. If the distributions as shown in FIG. 3 overlap, any MNDs therein are very uncertain and should contribute little, if at all, to the overall score. The generalized gamma distribution, which the MNDs of functional pixels approximately follow, may be represented as:

$$P_0(y) = \frac{1}{C} \int_y^{y+1} \frac{\lambda^\alpha x^{\alpha-1} e^{-\lambda x}}{\Gamma(\alpha)} dx \text{ for } y = 0, 1 \ldots L$$

where $0 < \alpha \leq 1$, y is the MND, $\Gamma(\alpha)$ is the Euler's gamma function, L the maximum possible MND, and "c", is a scaling factor. The $\alpha$ and $\lambda$ are computed as $\alpha = m^2/\sigma^2$ and $\lambda = m/\sigma^2$, where m is the mean of the measured MNDS, and $\sigma^2$ the variance.

Figure 4:
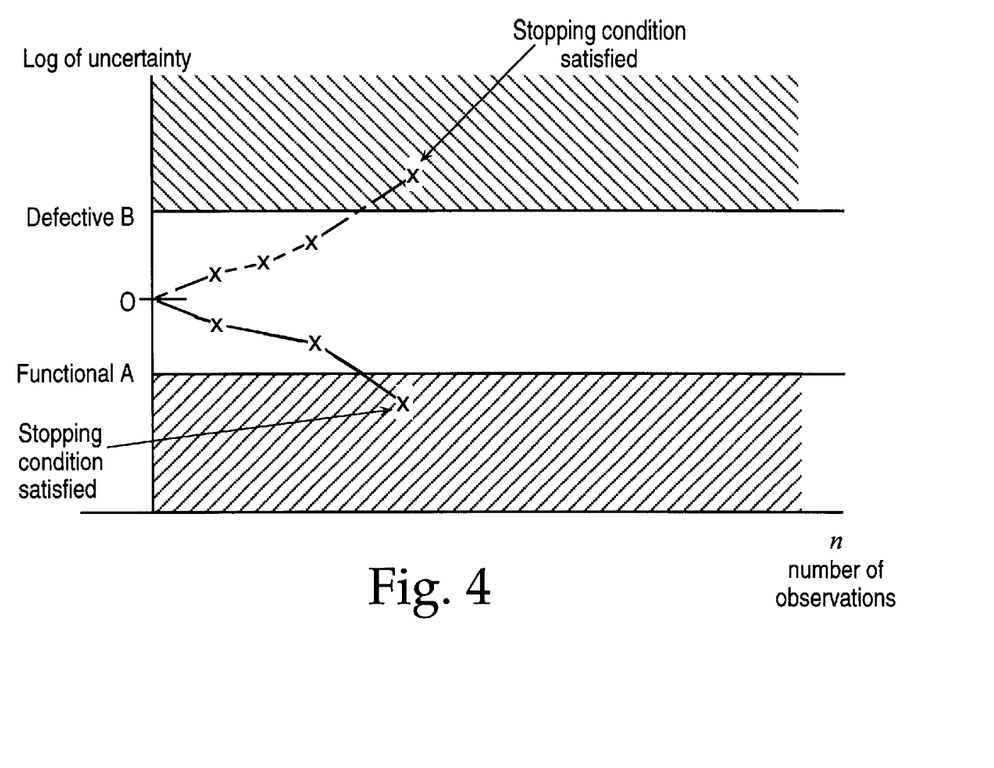
FIG. 4 is a representation of the number of observations (i.e., scanned images) needed for an accurate determination of classification of a pixel.

FIG. 4 is a representation of the number of observations (i.e., scanned images) needed for an accurate determination of classification of a pixel. According to SPRT theory, there is in a binary hypothesis scheme, a likelihood ratio that can be measured. The likelihood ratio is $P_1(y)/P_0(y)$ or the probability of the observed pixel having condition 1 (defective) divided by the probability of the observed pixel having condition 0 (functional). This likelihood ratio is a representation of the level of uncertainty regarding the measurements (MNDS) performed for a given pixel. Where the results are uncertain, more data (observations) in the way of more scanned in images may be needed. At each image scan and analysis, the likelihood ratio is multiplied together with past likelihood ratios, since each observation is an independent probabilistic event. This "accumulated" likelihood ratio is the "score" used to determine whether or not a pixel can be properly classified as defective or functional. If the logarithm of the accumulated likelihood ratio is considered, then the individual likelihood ratio at each observation may be added with previous likelihood ratios to determine and keep track of the score.

FIG. 4 shows a graph of the log of the likelihood ratio versus the number of desired observations. Two (or more) boundary or stopping conditions may be defined for the sensor array, a condition A wherein the pixel can be likely accurately classified as functional and a condition B wherein the pixel upon reaching that boundary, the pixel may likely be classified accurately as defective. Assuming a sequence of observations y1, y2 . . . yn are needed for a given pixel, the log of the likelihood ratio (i.e., log $(P_1(y)/P_0(y))$) may increase or decrease until it satisfies one of the two stopping conditions A and B. When no images (n=0) have yet been captured, the likelihood ratio is one, therefore the log is zero since it is equally probable that the given pixel is defective as it is functional without any prior observations or knowledge regarding the sensor. As each observation is made, the uncertainty diminishes. The likelihood ratio is greater than one when the pixel under consideration is more likely to be defective (i.e., $P_1(y) > P_0(y)$), and less than one when the pixel under consideration is more likely to be functional (i.e., $P_1(y) < P_0(y)$). The number of observations required for each pixel location depends upon the reliability or characteristics of neighboring pixels and thus may vary from image region to image region. In one region, it may be possible to reach a stopping condition with very few observations and in another, with more observations. The number of observations needed depends upon the image content and the type of defective pixel desired to be detected. Not all images that observed are equal in response. Where non-functional (i.e. defective) pixels are concerned, the center or peak location of the distribution of the MNDs may be more dependent upon the local neighboring pixel intensities. If a user is performing the pixel detection, the user may be capturing images of different scenes or the same scene with different lighting which makes the uncertainty problem worse since each subsequent observation in terms of the neighboring intensities of a given pixel may be different in nature. To compensate for this problem and add robustness to the SPRT, a weighting procedure may be incorporated as described below.

Figure 5A:
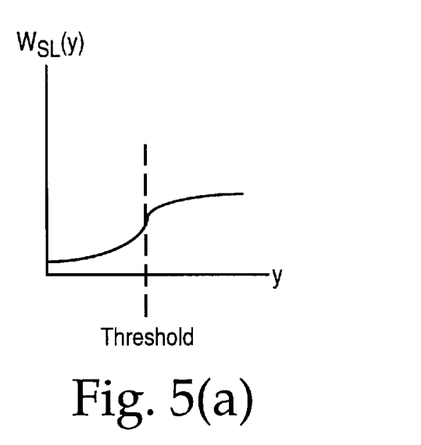
FIG. 5(a) illustrates a weighting function for a Stuck Low defect.

FIG. 5(a) illustrates a weighting function for a Stuck Low defect.

Since the content of each image (observation) is unknown, there may be conditions which yield abnormal likelihood ratios at those observations. For instance, if for a given observation, the $P_0(y)$ value is extremely low and approximately equal to zero, then that observation's likelihood ratio would approach infinity. As such, if this measurement is added to the accumulated likelihood ratio (score), then the score would abruptly increase, perhaps yielding a false conclusion. For instance, consider that the center of the distribution for a stuck low defect is approximately "b", the intensity value of the pixel yielding the MND, and thus the determination of the pixel score is dependent upon the neighboring pixel intensity. If a stuck low pixel were surrounded by low neighboring pixel intensities then it would be more difficult to decide based upon that observation whether that pixel is stuck low or not. Neighboring pixel intensity may be defined be "b", the intensity value of the pixel location yielding the MND.

Where neighboring pixel intensity is in the high end for yet another observation of that same stuck low pixel location, the likelihood ratio will be more meaningful and thus can be afforded more emphasis. To offset abnormal observations, each likelihood ratio obtained at each observation is weighted rather than being included in equal measure. The weighting function $W_{SL}(y)$ which varies from a minimum of zero (excluding the observation in the score) to a maximum of one (including the observation with full emphasis). As shown in FIG. 5(a), above a certain threshold neighboring intensity, individual likelihood ratios are given full or almost full emphasis and thus have weighting equaling or approaching one. Below that threshold, when the neighboring intensity is low, the emphasis on the observation is diminished and may even be weighted by a zero which would exclude the observation from the accumulated likelihood ratio.

Figure 5B:
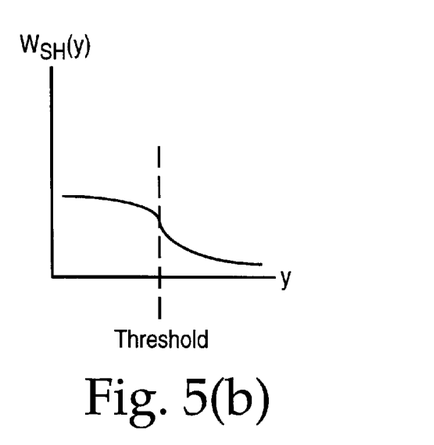
FIG. 5(b) illustrates a weighting function for a Stuck High defect.

In FIG. 5(b), a weighting function for a Stuck High defect is illustrated. A Stuck High pixel is one who returns a high intensity value for a given illuminant, near the very top of the range of possible intensities, even though the same illuminant when exposed to a functioning pixel, would return a low or medium intensity value. When detecting Stuck High defect, an observed likelihood is more relevant where the neighboring intensity is not high. Thus, in a weighting function for Stuck High defects, an observation where the neighboring intensity is high is given, according to a embodiment of the invention, less emphasis or maybe excluded from the accumulated likelihood ratio (i.e., the score) altogether by being given zero emphasis. Below a certain threshold, the weighting factor increases to one or near one consistent with the desired effect that observations where neighboring intensity is low should be given more or full emphasis in the score.

In detecting defective pixels, a first hypothesis will claim that a particular pixel location is functional or non-defective while a second will claim that the location is defective. In such probabilistic determinations, there is a likelihood that the decision made or hypothesis proven is incorrect even though the conditions for determination were satisfied. Incorrect results take the form of either a "false detection" or "miss detection." A "false detection" would result in a functional pixel being classified as defective while a "miss detection" would result in a defective pixel being classified as functional. In mapping out an image sensor for defective pixels, as long as defective pixels are detected properly, it is acceptable to have a small number of functional pixels that are mis-classified as being defective Thus, in detecting, the number of false detections are to be minimized in relation to miss detections which are to be avoided altogether.

Figure 6:
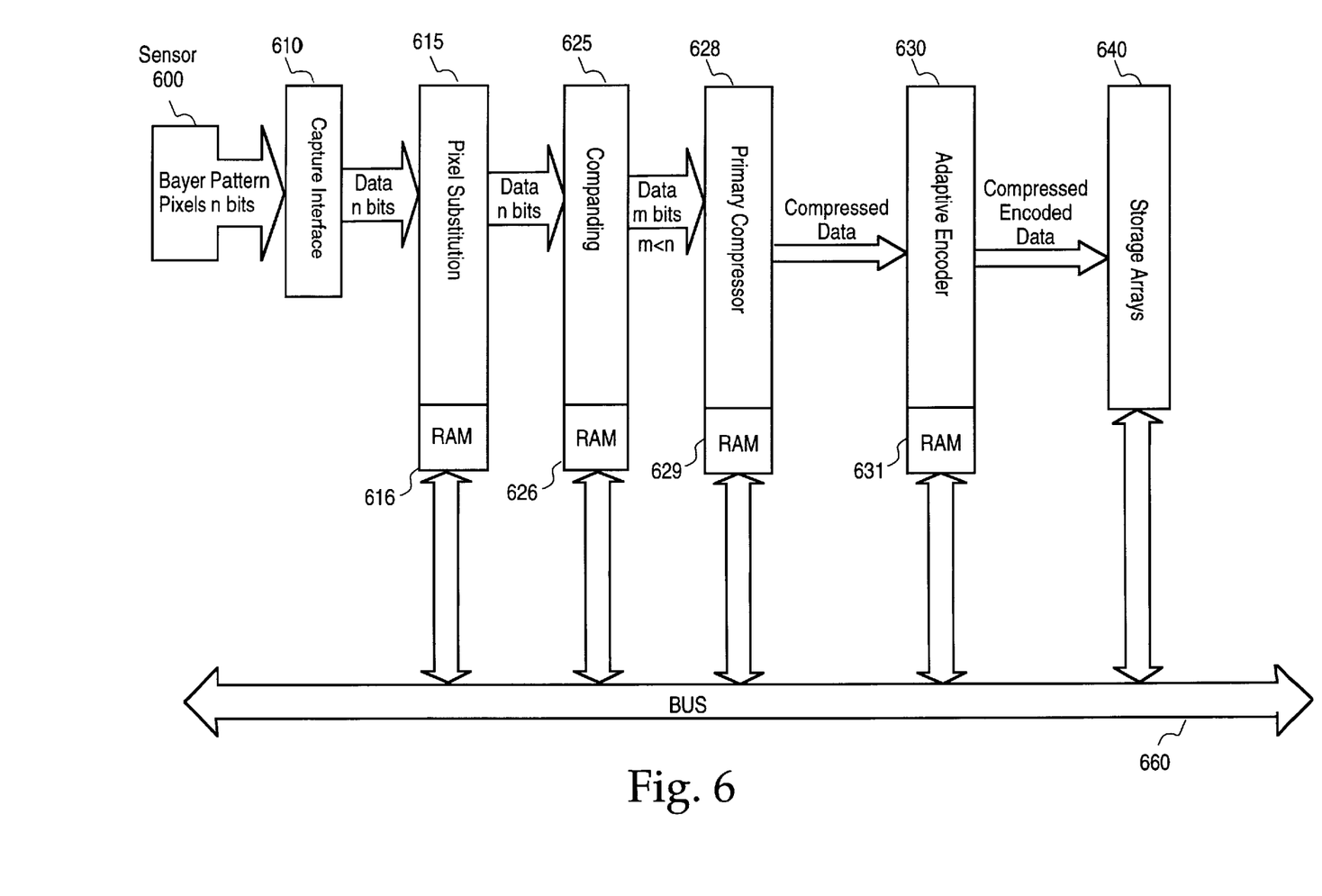
FIG. 6 is a block diagram of an image processing apparatus according to an embodiment of the invention.

FIG. 6 is a block diagram of an image processing apparatus according to an embodiment of the invention.

FIG. 6 is a block diagram of internal image processing components of an imaging device incorporating at least one embodiment of the invention including an adaptive encoder. In the exemplary circuit of FIG. 6, a sensor 600 generates pixel components which are color/intensity values from some scene/environment. The n-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three (or four if G1 and G2 are considered separately) color planes and may form together a Bayer pattern raw image. These R, G and B color "channels" may be compressed and encoded separately or in combination, whichever is desired by the application. Capture interface 610 resolves the image generated by the sensor and assigns intensity values to the individual pixels. The set of all such pixels for the entire image is in a Bayer pattern in accordance with typical industry implementation of digital camera sensors.

Figure 7:
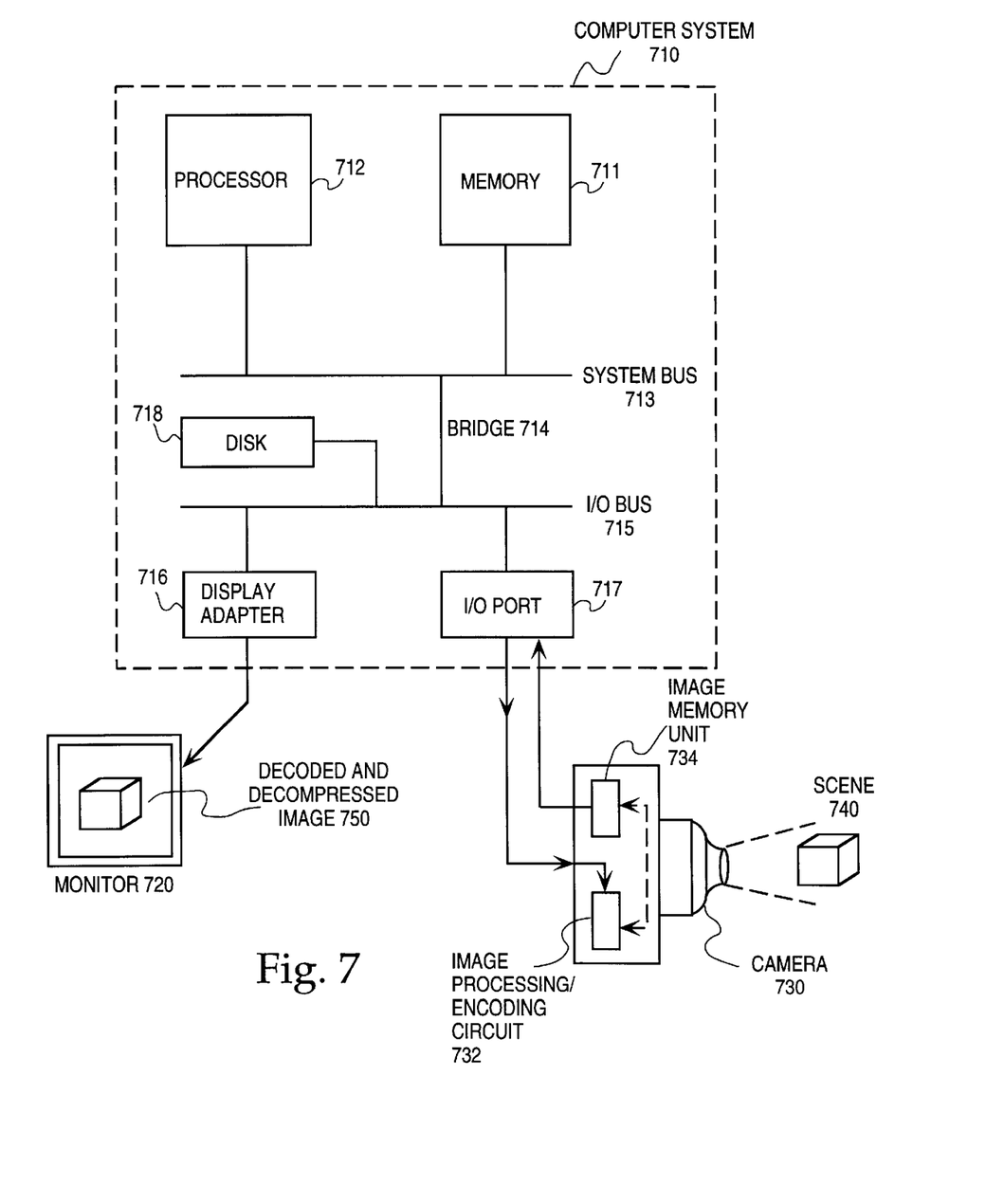
FIG. 7 is a system diagram of one embodiment of the invention.

It is typical in any sensor device that some of the pixel cells in the sensor plane may not respond to the lighting condition in the scene/environment properly. As a result, the pixel values generated from these cell may be defective. These pixel locations are called "defective pixels." In one embodiment of the invention, a "pixel substitution" unit 615 may replace the value read out in each dead pixel by the intensity value immediate previously valid pixel in the row. A RAM 616 consists of the row and column indices of the dead pixels, which are supplied by the defective pixel substitution methodologies presented in various other embodiments. The methodology for detecting which pixels in the sensor are defective may be carried out by a computer system or other such device as illustrated in FIG. 7. The resulting tally of row and column indices of the defective pixel locations may be loaded into RAM 616 via the bus 660 which facilitates data transfer in bi-directional capacity between the imaging apparatus and external devices. In an alternate embodiment substitution unit 615 may be eliminated from the imaging apparatus in favor of some form of post-processing, such as filtering or averaging, after the image is downloaded or is ready to be displayed.

In the imaging apparatus, companding module 625 is designed to convert each original pixel of n-bit (typically n=10) intensity captured from the sensor to an m-bit intensity value, where m<n (typically, m=8). Companding module 625 is not needed if the sensor 600 and capture interface 610 provide a standard 8-bit per-pixel value. Defective pixel detection should be performed in accordance with the relevant intensity range of the sensor which if originally is a higher bi-resolution such as 10-bit, should consider the high end of the intensity range to be 1023 and not 255 (for 8-bit intensity values) as discussed above.

A primary compressor 628 receives companded sensor image data and performs image compression such as JPEG or DWT. A RAM 629 can be used to store DWT coefficients and/or quantization thresholds for each channel/sub-band as desired in executing such compression. Primary compressor 628 can be designed to provide outputs which are sensitive or corrective of defective pixel locations and their values, sending such compressed values to Encoder/Data Packer 630.

Each of the RAM tables 616, 626, 629 and 631 can directly communicate with a bus 660 so that their data can be loaded and then later, if desired, modified. Further, those RAM tables and other RAM tables may be used to store intermediate result data as needed. When the data in storage arrays 640 is ready to be transferred external to the imaging apparatus of FIG. 6 it may be placed upon bus 660 for transfer. Bus 660 also facilitates the update of RAM tables 616, 626, 629 and 631 as desired. Depending on the design of the apparatus, a diagnostic capture mode may be provided that performs limited or no compression and no data correction while the identifying defective pixels is being undertaken.

FIG. 7 is a system diagram of one embodiment of the invention.

FIG. 7 illustrates a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture an image of a scene 740. Essentially, captured images are processed by an image processing circuit 732 so that they can be efficiently stored in an image memory unit 734, which may be a RAM or other storage device such as a fixed disk. The image(s) contained within image memory unit 734 that is destined for computer system 710 can be according to one embodiment of the invention, for the purpose of determining the defective pixel locations of the camera 730. In most digital cameras that can perform still imaging, images are stored first and downloaded later. This allows the camera 730 to capture the next object/scene quickly without additional delay. The use of a computer system 710, particularly in detecting defective pixel locations of the camera, reduces the computation/storage requirements of the camera 730 allowing for a less complex and thus, more inexpensive manufacture.

The image processing circuit 732 carries out the pixel substitution (if any), companding and compression of images captured by the camera 730. When a captured image, whether compressed or raw, is downloaded to computer system 710, it may be decoded and then rendered to some output device such as a printer (not shown) or to a monitor device 720. The execution of the defective pixel detection methodology described above, and image decompression, if needed, may be achieved using a processor 712 such as the Pentium™ processor with MMX Technology (a product of Intel Corporation) and a memory 711, such as RAM, which is used to store/load instruction addresses and result data.

The application(s) used to perform the detecting of defective pixels based on a series of images downloaded from camera 730 may be from an executable compiled from source code written in a language such as C++. The instructions of that executable file, which correspond with instructions necessary to scale the image, may be stored to a disk 718 or memory 711. Further, such application software may be distributed on a network or a computer-readable medium for use with other systems.

When an image, such as an image of a scene 740, is captured by camera 730, it is sent to the image processing circuit 732. Image processing circuit 732 consists of ICs and other components which may execute, among other functions, the compression of the image pixel data set compensated by defective pixel correction. The image memory unit 734 will store the compressed/encoded image data. Once all pixels are processed and stored or transferred to the computer system 710 for rendering the camera 730 is free to capture the next image. When the user or application desires/requests a download of images, the encoded image data in the image memory unit, are transferred from image memory unit 734 to the I/O port 717. I/O port 717 uses the bus-bridge hierarchy shown (I/O bus 715 to bridge 714 to system bus 713) to temporarily store the data into memory 711 or, optionally, disk 718. Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

According to one embodiment of the invention, the detecting of defective pixels may be achieved on computer system 710 by downloading and analyzing a series of images from camera 730. The defective pixel location data may be stored in a disk, memory 711 or other storage mechanism and can be used in perform correction or enhancement of any downloaded image. Post download correction of defective image locations eliminates the need for incorporating such features into the camera 730. Computer system 710 during pixel detection will perform such computations as the computing of likelihood ratios, weighting and accumulation of same as well as comparison of scores with boundary or stop conditions, and computation of MNDs. The computer system is also more ideally suited to storing the large number of data points required in compiling a histogram or distribution of values.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method of detecting defective sensors in a sensor array comprising:

performing an observation of an object on a sensor array having a plurality of pixels, each pixel corresponding to a sensor of said sensor array and each sensor generating a pixel value for the corresponding pixel;

for each of said pixels, determining a score based on statistical analysis of said pixel values using said observation; and if said score for said each pixel satisfies a stopping condition, classifying said each pixel as being one of either defective or functional.

2. A method according to claim 1 wherein determining a score includes:

measuring image content; and compiling statistics of said image content.

3. A method according to claim 2 wherein said image content includes pixel values.

4. A method according to claim 3 wherein said statistics include one or more of mean, variance and standard deviation measurements as a function of image content measured by the pixel values.

5. A method according to claim 1 wherein determining a score includes:

computing an individual likelihood ratio for each said observation; and accumulating said individual likelihood ratios into said score.

6. A method according to claim 5 wherein said individual likelihood ratio is formed by a ratio of the probability that said each pixel is functional to the probability that said each pixel is defective.

7. A method according to claim 6 wherein said individual likelihood ratios are weighted in accordance with the relevance of said observation.

8. A method according to claim 7 wherein said relevance is a function of neighboring pixel intensity.

9. A method according to claim 6 wherein said probabilities are determined by measuring at minimum neighboring distance from said each pixel.

10. A method according to claim 9 wherein said minimum neighboring distance is determined by:

by computing absolute value of the pixel value differences between said each pixel and each of the neighboring pixels; and finding a minimum among said absolute value of pixel value differences.

11. An article comprising a machine-readable medium having instructions stored thereon which when executed causes:

determining a score for each of a plurality of pixels, said pixels corresponding to an observation of an obect by sensors of a sensor array said score being based on statistical analysis of pixel values generated by said sensors according to said observation; and if said score for said each pixel satisfies a stopping condition, classifying said each pixel as being one of either defective or functional.

12. A system comprising:

a memory capable of storing instructions and data related to defective pixel detection;

a processor coupled to said memory, said processor adapted to execute said instructions and manipulate said data to determine which pixels of an image sensor are defective, said instructions including:

for each of said pixels that are unclassified, determining a score based on statistical analysis of pixel values generated by said image sensor according to an observation; and if said score for said each pixel satisfies a stopping condition, classifying said each pixel as being one of either defective or functional.

13. A system according to claim 12 further comprising:

an image sensor array providing data in the form of pixel values, each pixel corresponding to a sensor of said sensor array, said sensor array adapted to scan an image for each desired observation.

14. A system according to claim 12, comprising:

a defective pixel location memory adapted to store locations of pixels determined defective.

15. A system according to claim 13, wherein said image sensor scans are adjusted according to said pixels classified as defective.

16. A system according to claim 12, wherein determining a score comprises, compiling statistics of pixel values, wherein said statistics include one or more of mean, variance and standard deviation measurements as a function of image content measured by the pixel values.

17. A system according to claim 12, wherein determining a score includes:

computing an individual likelihood ratio for each said pixel for said observation;

accumulating said individual likelihood ratios into said score wherein said individual likelihood ratio is formed by a ratio of the probability that said each pixel is functional to the probability that said each pixel is defective wherein said individual likelihood ratios are weighted in accordance with neighboring pixel values.

18. A system according to claim 17, wherein said probabilities are determined by measuring at minimum neighboring distance from said each pixel wherein said minimum neighboring distance is determined by computing absolute values of the pixel value differences between said each pixel and each of said neighboring pixels and finding a minimum among said absolute values of pixel value differences.

19. An article according to claim 11, wherein determining a score comprises, compiling statistics of pixel values, wherein said statistics include one or more of mean, variance and standard deviation measurements as a function of image content measured by the pixel values.

20. An article according to claim 19, wherein determining a score includes:

computing an individual likelihood ratio for each said pixel for said observation;

accumulating said individual likelihood ratios into said score wherein said individual likelihood ratio is formed by a ratio of the probability that said each pixel is functional to the probability that said each pixel is defective wherein said individual likelihood ratios are weighted in accordance with neighboring pixel values.

* * * * *

UNITED STATES PATENT AND TRADEMARK OFFICE
CERTIFICATE OF CORRECTION

PATENT NO. : 6,625,318 B1 Page 1 of 1
DATED : September 23, 2003
INVENTOR(S) : Tan et al.

It is certified that error appears in the above-identified patent and that said Letters Patent is hereby corrected as shown below:

Column 5,
Line 1, delete "|1255-b|", insert -- |255-b| --.

Column 10,
Line 38, delete "intensity", insert -- values --.
Line 55, after "sensor array", insert -- , --.

Signed and Sealed this

Seventeenth Day of February, 2004

JON W. DUDAS
*Acting Director of the United States Patent and Trademark Office*